United States Patent Office 3,548,006
Patented Dec. 15, 1970

3,548,006
ALDEHYDES USEFUL IN PERFUMERY
Igor Scriabine, Paris, France, assignor to Rhone-Poulenc S.A., Paris, France, a French body corporate
No Drawing. Continuation-in-part of application Ser. No. 351,223, Mar. 11, 1964. This application Oct. 23, 1965, Ser. No. 504,058
Claims priority, application France, Mar. 15, 1963, 928,161; Nov. 13, 1964, 994,846; Apr. 27, 1965, 14,857; Oct. 19, 1965, 35,495
Int. Cl. C07c 47/52
U.S. Cl. 260—599
2 Claims

ABSTRACT OF THE DISCLOSURE

The invention provides novel substituted hydrocinnamaldehydes of superior stability which are useful in perfumery.

---

This application is a continuation-in-part of Ser. No. 351,223 filed Mar. 11, 1964, and now abandoned.

This invention relates to perfumery and more specifically to novel compositions, of great value for use in the soap, detergent, perfume and cosmetic industries.

For a long time, perfumery has been no more than an art consisting of the production of fragrances, through the combination of natural odoriferous substances in definite proportions, with most of the formulations being kept as secrets of the trade. More recently, however, perfumery has experienced a tremendous technological and economical upswing and today may properly be classified as a science. On one hand, scientific techniques have been developed, such as chromatography and infrared analysis, which have permitted to evaluate objectively new synthetic perfumes, and to correlate odor with chemical structure. On the other hand, the demand for superior and more diversified fragrance materials, by several industries, for instance the soap, detergent and cosmetic industries, has greatly increased and has provided a powerful stimulus for the growth of synthetic perfumes.

Recently also aerosols have presented new perfuming problems since they require not only compatibility with the hydrocarbons, which are used as propellants but also perfuming agents which are stable to oxidation by air in finely dispersed form and which are not irritating to the skin, nose or throat.

Manifestly, modern perfumes must satisfy many requirements of different industries, the most important of which are:

(1) A greater variety of fragrances for the expanding number of consumer products, and ability to blend with a variety of fragrances, (2) Better performance characteristics, such as diffusiveness, lasting power, stability to acid, alkali, as well as neutral conditions, (3) Stability to air oxidation, (4) Availability and dependability of raw materials.

Cyclamen aldehyde, that is, para-isopropyl-alpha-methyl hydrocinnamaldehyde described for the first time in 1932 in U.S. Pat. 1,844,013, has been used for its cyclamen odor and for the creation of cyclamen and lily of the valley or muguet compositions. The amount of this substance that can be incorporated is severely limited in most other floral compositions, except in the case of lilac, lily, and violet, which tolerate it in moderate amounts. The disadvantage is that in many compositions, for instance, muguet, the blend with cyclamen aldehyde is not entirely satisfactory, and an excessive sweetness is detectable, which usually must be concealed by the addition of aliphatic aldehydes.

Even more serious than the above-mentioned disadvantage, is the lack of stability of p-isopropyl-alpha-methyl hydrocinnamaldehyde in many applications, in both alkaline and acidic media and its ease of oxidation by air. For instance, Forseman and Pantaleoni, Drug and Cosmetic Industry 75 38–39, 123–4 (1954), made a comprehensive study of many perfumes to determine the feasibility of incorporating the perfumes into aerosols together with a propellant and reported that p-isopropyl-alpha-methyl hydrocinnamaldehyde is totally unsatisfactory for that purpose, because it is unstable to air oxidation.

The insufficient stability of p-isopropyl-alpha-methyl hydrocinnamaldehyde has also been noted in U.S. Pat. 2,875,131, where it is reported that cosmetic preparations containing this substance become rancid upon exposure to light for extended periods of time. It is also stated in the above-mentioned patent that its incorporation into soaps, leaves much to be desired, because the odor becomes weak on standing for a few weeks, and a sharp unpleasant note develops, on more prolonged aging. Manifestly, the incorporation of p-isopropyl-alpha-methyl hydrocinnamaldehyde into many cosmetic products such as talcum powder, deodorant compositions, cold cream, soaps and detergents is not fully satisfactory.

Since the introduction of cyclamen aldehyde, many other substituted hydrocinnamaldehydes have been synthesized by a variety of methods and most of them are less suitable for incorporation into cosmetic, soap and detergent compositions, either because of their weak or less pleasant odor, or because of insufficient stability to air, acid and alkali. For instance, it is reported in U.S. Pat. 2,875,131 that the following, among many others, do not possess noteworthy odor value:

4-methyl-alpha-methyl hydrocinnamaldehyde
4-ethyl-alpha-methyl hydrocinnamaldehyde
4-n-propyl alpha-methyl hydrocinnamaldehyde
2-methyl-5-tert-butyl-alpha-methyl hydrocinnamaldehyde
4-tert-amyl-alpha-methyl hydrocinnamaldehyde Para-sec-butyl hydrocinnamaldehyde has been reported in Bull. soc. chem. France, (1964) 1194, as possessing a linden blossom odor, but, due to defective stability, it has found no application in perfumery. The alpha-methyl homolog is described as having only a faint odor.

U.S. Pat. 2,976,131, and U.S. Pat. 2,875,131 describe and claim p-tertiary-butyl hydrocinnamaldehyde, and p-tertiary-butyl alpha-methyl hydrocinnamaldehyde. These products possess cyclamen and linden-blossom type odors but they have definite deficiencies that limit their application in perfumes and cosmetics, as is shown later in this application. The latter has limited odor strength and compositions containing both substances are subject to air oxidation and to degradation in both alkaline and acid media. Another disadvantage of both the p-tertiary butyl hydrocinnamaldehyde and the p-tertiary butyl alpha-methyl hydrocinnamaldehyde is that, when incorporated into perfume compositions, they do not produce novel fragrances, but give essentially the same fragrances obtainable by the conventional combination of hydroxy citronellal, terpineol and linalool.

Undoubtedly the odor and the stability of the hydrocinnamaldehydes to air oxidation, to acid and alkali, is affected by many factors such as (1) substitution in the alpha-position of the propionaldehyde chain, (2) the length of the chain and (3) chemical structure of the substituent attached to the aromatic ring, and in the case of alkyl groups, whether it is $CH_3$— or —$CH_2R$ or —$CHR_2$ or —$CR_3$.

It is an object of this invention to provide novel arylaliphatic aldehydes, which exhibit very valuable, powerful and long lasting odors, suitable for incorporation into many fragrances for perfumes and cosmetics.

It is another object of this invention to provide new arylaliphatic aldehydes which are stable to air oxidation, to acid and alkaline conditions and which are superior to other substances heretofore known, for incorporation into perfumes and cosmetics, such as soaps, detergent compositions, cosmetic creams, lipsticks, talcum powder, antiperspirants, and aerosol formulations.

Still another object is to provide perfume formulations incorporating the substances of this invention.

It has now been found that very desirable properties for use as perfume materials, namely very valuable fragrances and high stability to air oxidation, to acid and alkali, are found in substituted hydrocinnamaldehydes having a molecular weight between 190 and 232, additionally containing an alkyl or alkenyl substituent with at least four carbon atoms attached to the benzene ring. The substituent may be an open chain or cyclic, or it may be a closed ring fused with the aromatic benzene ring. For instance, the aromatic ring may be the tetrahydronaphthalene nucleus, in which case the substituent may be viewed as a four-carbon tetra-methylene ring structure, fused to the benzene ring. The substituent may be in the para or in the ortho position, with respect to the aliphatic aldehyde chain, or the product may be a mixture of the two isomers. Substitution on the aromatic ring with groups containing more than six carbon atoms, is not advantageous, because the products have insufficient odor strength.

It has also been found that stability is generally favorably affected by a —$CH_2R$ group (primary alkyl) attached to the aromatic ring, rather than —$CH\ (R_2)$ or —$C\ (R)_3$ group. Thus, the preferred substances, within the scope of the invention have the general formula

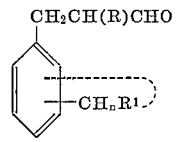

$CH_2CH(R)CHO$ $CH_nR^1$ in which R is either —$CH_3$ or H, and $CH_nR^1$ is an alkyl or alkenyl group, straight chain or branched, containing between 4 and 6 carbon atoms or a cycloalkyl or fused ring, the latter containing 4 carbon atoms. When $CH_nR^1$ is an open chain or a fused ring, $n$ is equal to 2, and when $CH_nR^1$ is a cycloalkyl ring, for instance the cyclohexyl, $n$ is equal to 1.

It has also been found, surprisingly, as it will be demonstrated in more detail below, that the hydrocinnamaldehydes of this invention in which the aliphatic aldehyde chain is unsubstituted, exhibit unusually strong odor, and are remarkably stable to air oxidation, as well as in the range of acid, and neutral conditions. On the other hand, the hydrocinnamaldehydes with a methyl group in the alpha-position, are somewhat less stable in an acidic medium, but exhibit, surprisingly, outstanding stability in an alkaline medium. In this respect, the present invention provides a variety of novel perfuming agents, which satisfy the different requirements of the perfume, cosmetic and soap industries, insofar as the most suitable fragrances may be selected according to the conditions of application.

The substances, within the scope of this invention, exhibit the strong floralcy character of the cyclamen type, but offer infinitely greater possibilities of application than p - isopropyl - alpha - methyl hydrocinnamaldehyde. Being free of the heavy sweetness of this substance, they are far more suitable for general use, and for incorporation into almost unlimited blends, particularly jasmin, rose, honeysuckle, flower of orange, mimosa, lilac, hyacinth, lily and magnolia. Another advantage is that the substances of this invention do not produce irritating or disagreeable reaction on the human skin or mucous membranes, even in high concentration.

The substances of this invention may be prepared by a variety of processes. One process as described in U.S. Pat. 1,844,013, consists of reacting the substituted benzaldehyde with acetaldehyde or propionaldehyde, to obtain a substituted cinnamaldehyde, which is then hydrogenated to the substituted hydrocinnamaldehyde. Another process is described by Poizat in French Pat. 833,644, and consists of reacting a substituted benzyl chloride with malonic ester or methyl malonic ester, followed by hydrolysis and monodecarboxylation, to give the substituted hydrocinnamic acid which is then reduced to the corresponding aldehyde. Very convenient is the process described in my U.S. Pat. 3,023,247, which comprises reacting an aromatic compound with an unsaturated aldehyde of general formula $CH_2$=CACHO or an alken-2-ylidene diacylate of general formula CHB=CACH(OCOR)$_2$ in which A and B are hydrogen atoms or alkyl groups and which may be the same or different. The reaction is conducted in the presence of a Friedel-Crafts type catalyst, for instance titanium tetrachloride, and a promotor, for instance, boron trifluoride. Hydrolysis of the alken-2-ylidene diacylate to the aldehyde, is required if the diacylate derivative of the aldehyde has been used. This process gives primarily the para isomer, in mixture with varying amount of the ortho isomer. The content of the para isomer, varies between 70 and 100%, with the ortho isomer in amount between zero and 30%. When the substituent is the fused tetramethylene ring from tetrahydronaphthalene, the 3,4-tetramethylene isomer is obtained exclusively.

Separation of the para and ortho isomers for all practical purposes, generally, is not necessary, because the mixture is stronger and richer than the pure para isomer alone. The ortho isomer is usually characterized by a very powdery and warm nuance and its presence intensifies the natural character and perfume value of the mixture.

The following examples are given by way of illustration of the invention.

EXAMPLE 1

Preparation of isobutyl hydrocinnamaldehyde

Into a filask, equipped with a mechanical stirrer, dropping funnel and a column, provided with a calcium chloride tube, were placed 9 moles (1206 grams) of isobutyl benzene, 1.9 mole (369 grams) of titanium tetrachloride and 5.6 grams boron trifluoride diethyl etherate complex. The mixture was cooled under stirring to —10° C. A mixture of 1.9 mole (285 grams) of acrolein diacetate and 2 moles (270 grams) of isobutyl benzene was added, from the dropping funnel, which was kept at —10° C., by circulation of brine. The addition required 2 hours, while maintaining the inside temperature at —10° to —14° C.

After stirring for an additional 1.5 hours, the reaction mixture was poured into 1.5 kg. of ice and 300 ml. of hydrochloric acid (density 1.18). After separation of the organic layer and extraction of the aqueous layer with 150 ml. of benzene, the combined organic layer was washed with 180 ml. of water, then with three 200 ml. portion of 5% aqueous sodium tartrate solution, and dried over anhydrous magnesium sulfate. The residue (392 grams) after removal of benzene and excess isobutyl benzene by distillation, was the crude enolic acetate.

The crude product from above, 357 grams, was refluxed under nitrogen, 9 hours, with 300 ml. 6 N sulfuric acid, 1500 ml. of 95% alcohol, and 0.2 gram hydroquinone. After cooling to 60° C., 750 ml. of water were added. The reflux condenser was replaced by a Vigreux column, the alcohol and ethyl acetate formed during the hydrolysis, were distilled off, the residue cooled to 25° C., the organic layer separated and the aqueous layer extracted with three portions 200-ml., 150-ml., and 150-ml., respectively, of ether. The combined ether layer was washed with water until free of sulfate ion and dried over magnesium sulfate. After removal of the ether, vacuum distillation gave 184.5 g. of isobutyl hydrocinnamaldehyde, B.P. 104° C./1.5 mm.; $n_D^{20}=1.5065$. (Yield: 59% of theoretical, based on acrolein diacetate.)

Vapor phase chromatography showed that the product was a mixture of the para and ortho isomer, in the proportion of 75:25. The mixture of para and ortho isomers, possesses not only the cyclamen floralcy, but also a fresh, flowery, pollen-like fragrance, and a broad, full odor, reminscent of sandalwood, iris, lime tree, lilac, labdanum, and especially the mimosa flower. The novel material is particularly useful in compounding mimosa, acacia, cassie and a variety of floral perfumes. The sandalwood and labdanum notes are valuable in compounding amber and oriental type perfumes, in which the latter two natural substances are almost indispensable.

EXAMPLE 2

Preparation of isobutyl-alpha-methyl hydrocinnamaldehyde

Twelve hundred and six grams of isobutyl benzene, 369 g. of titanuim tetrachloride, 5.6 g. of boron trifluoride diethyletherate complex were placed in a flask, equipped with mechanical stirrer, dropping funnel, cooled by circulation of brine and a column provided with a drying tube. After cooling to $-10°$ C., a mixture of 302 g. methacrolein diacetate and 270 g. of isobutyl benzene was added from the dropping funnel, during the course of two hours, keeping the temperature in the reaction vessel and in the funnel at $-10°$ C. After stirring for an additional 30 minutes, the reaction mixture which had acquired a slight orange color, was poured into 1 kg. of ice and 180 ml. of hydrochloric acid (density 1.18). After separating the yellow organic layer, the aqueous layer was extracted with 150 ml. of benzene, the combined organic layer washed with 180 ml. of water, then three times with 150 ml. portion 5% aqueous sodium tartrate, and dried over anhydrous magnesium sulfate. The benzene and excess isobutyl benzene were removed by distillation, giving 340 g. of crude 2-methyl 3-(p-isobutylphenyl) propen-1-yl-monoacetate. The latter was hydrolyzed by refluxing 13 hours under nitrogen with 270 ml. of methanol, 600 g. of water and 265 g. of potassium carbonate.

After removal of methanol by distillation, the mixture was cooled, the organic layer separated and the aqueous layer extracted with four 65 ml. portions of diethyl ether. The combined organic layer was washed with five 30-ml. portions of water, dried over magnesium sulfate, the ether distilled off and the residue fractionated under vacuum. There was obtained 187.6 grams of isobutyl-alpha-methyl hydrocinnamaldehyde, B.P. 123° C./5 mm.; $n_D^{20}=1.5052$. (Yield: 53%, based on the methacrolein diacetate.)

The product contained a mixture of 77% para isomer and 23% ortho isomer, determined by vapor phase chromatography.

The odor of isobutyl-alpha-methyl hydrocinnamaldehyde differs from the p-isopropyl and p-tertiary butyl compounds and has most of the advantages of both. It is lighter, fresher, more effusive than the p-tertiary butyl compounds, and in perfume compositions is free of the flattening effects characteristic of the latter. It differs from the p-isopropyl compound in being much less sharp while preserving a very high level of intensity, so that it may be used in high proportion to obtain novel effects in perfumery. It has the desirable floral and honeysuckle notes of the p-isopropyl compound and also has a velvety sandalwood nuance which is absent in the cyclamal and subdued in the p-tertiary butyl compound. Isobutyl-alpha-methyl hydrocinnamaldehyde has exceptional odor versatility. It is almost universally applicable to the creation of floral perfumes and specialties especially jasmin, rose, honeysuckle, orange flower, mimosa, and lilac. In addition its lively sandalwood character finds wide use as a base for oriental and aldehyde types and in the creation of fantasy perfumes.

When isobutyl benzene of Examples 1 and 2 is replaced by the equivalent amounts of other substituted benzenes such as n-butyl benzene, n-amyl benzene, isoamyl benzene, n-hexyl benzene, cyclohexyl benzene, tetrahydronaphthalene, 2-butenyl benzene, the other products of this invention can be prepared in equally good yield and high purity. Pure n-amyl benzene, isoamyl and n-hexyl benzene were prepared by acylation of benzene with the appropriate acyl chloride, followed by Wolff-Kishner reduction of the intermediate ketones.

EXAMPLE 3

Isolation of para and ortho isomers of isobutyl-alpha methyl hydrocinnamaldehyde The method of separation of the two isomers is described in detail below for isobutyl-alpha-methyl hydrocinnamaldehyde. It is to be understood, however, that the other novel compounds of the invention are separated into para and ortho isomers equally satisfactorily by the same procedure.

One hundred and twenty grams of sodium metabisulfite and 1 liter of water were placed in a 10-liter flask, provided with a dropping funnel. The temperature was raised to 50° C., to dissolve the salt, then 100 g. of the aldehyde prepared in Example 2, containing 77% of the para isomer, was added under stirring, under nitrogen atmosphere. After warming for one hour at 60° C., 5.5 l. of water and 550 g. of sodium metabisulfite were added, the mixture was kept under agitation one hour longer at same temperature and then allowed to cool.

The bisulfite addition product of the para isomer which had separated on cooling, was filtered off and washed with 10% sodium metabisulfite solution. The free aldehyde, the para isomer, was obtained by the addition of sodium carbonate, extraction and vacuum distillation. B.P. 99°/0.8 mm.; $n_D^{20}=1.5005$.

To the filtrate there was added 500 ml. of sodium hydroxide, 30% by weight, to a pH between 8 and 9, followed by 27 g. of sodium carbonate. After stirring one hour at 60° C., in a nitrogen atmosphere, and cooling, the reaction mixture was extracted with ether, washed with water to neutrality, and dried over magnesium sulfate. The ortho isomer, recovered by distillation, still contained 5% para isomer and 2% impurities. Complete purification was obtained by dissolving 10 g. of the product in 70 ml. ether, and adding under stirring, 150 ml. water, 21.25 g. silver nitrate and 10 ml. of 30% sodium hydroxide. After stirring for several hours to remove the last traces of the para isomer, the ether layer was separated, the aqueous layer extracted with ether, and the combined ether layer washed with water to neutrality and dried over magnesium sulfate. The pure ortho isomer was obtained by distillation. B.P. 104°/1.1 mm.; $n_D^{20}=1.5052$.

Isobutyl hydrocinnamaldehyde prepared in Example 1, was separated into the para and ortho isomers using the same procedure. Characteristics of the para isomer: B.P. 104°/1.5 mm.; $n_D^{20}=1.5065$. Characteristics of the ortho isomer: B.P. 80° C./0.25 mm.; $n_D^{20}=1.5110$.

The odor properties of the pure para and ortho isomers in both instances for the unmethylated and the alpha-methyl compounds, are closely related to each other and to the original mixture. The ortho isomer possesses a powdery and woody note which is especially fine and valuable.

Pure ortho-isobutyl-alpha-methyl hydrocinnamaldehyde is close to the para isomer, for its cyclamen-type odor but exhibits an iris, powdery and woody note, which makes it particularly valuable. The odor is less sharp and yet stronger than the para isomer. It exhibits a still broader floral scent, which makes it extremely useful for incorporation into a variety of perfume compositions. As already mentioned above, in view of the valuable olfactory properties of the ortho isomer, it is not necessary to separate the ortho from the para isomer for ordinary use, but the mixture has more complete, richer odor and is more suitable than the para isomer alone for incorporation into a variety of perfume compositions. The pure ortho isomer, which is more expensive to prepare, may be advantageous for the achievement of special nuances.

For the purpose of characterization, the boiling points and refractive index of the novel hydrocinnamaldehydes of the invention are listed in Table I below. Unless indicated, the compounds are the mixtures of ortho and para isomer, the para isomer predominating in each case.

TABLE I

| Name of substituted hydrocinnamaldehyde | B.P., °C./mm. | $n_D^{20}$ |
|---|---|---|
| n-Butyl | 110/2 | 1.5085 |
| n-Butyl-alpha-methyl | 106/1.0 | 1.4913 |
| Isobutyl | 104/1.5 | 1.5065 |
| para Isomer | 104/1.5 | 1.5055 |
| ortho Isomer | 80/0.25 | 1.5110 |
| Isobutyl-alpha-methyl | 123/5 | 1.5020 |
| para Isomer | 99/0.8 | 1.5005 |
| ortho Isomer | 104/1.1 | 1.5052 |
| n-Amyl | 130/1.0 | 1.5052 |
| n-Amyl-alpha-methyl | 135/1.0 | 1.5006 |
| Isoamyl[1] | 95/0.4 | 1.5025 |
| Isoamyl-alpha-mehtyl | 97/0.3 | 1.4992 |
| n-Hexyl | 145/1.0 | 1.5018 |
| n-Hexyl alpha-methyl | 147/1.0 | 1.5012 |
| Cyclohexyl | 122/0.4 | 1.5226 |
| Cyclohexyl-alpha-methyl | 120/0.3 | 1.5335 |
| 3,4-tetramethylene [2] | 120/1.0 | 1.5489 |
| 3,4-tetramethylene-alpha-methyl [2] | 125/1.0 | 1.5411 |
| n-2-Butenyl | 89/0.3 | 1.5321 |
| n-2-Butenyl-alpha-mehtyl | 118/1.0 | 1.5238 |

[1] Isoamyl is the radical

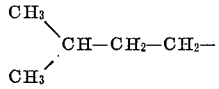

[2] Only one isomer, as indicated, was obtained.

cinnamaldehyde and isobutyl-alpha-methyl hydrocinnamaldehyde and their pure ortho and para isomers have already been characterized (Examples 1, 2, 3) and compared with the commercial products p-isopropyl-alpha-methyl hydrocinnamaldehyde and p-tert-butyl-alpha-methyl hydrocinnamaldehyde. These are merely summarized in column A. In column B the relative odor strength is tabulated in numerical expression. These comparative values are highly significant in the group of related odorants where the odors are close enough to each other to permit the establishment of equal odor levels. The odor strength was determined in a solvent, alcohol or diethyl phthalate with strips of blotting paper dipped evenly into the solutions or directly from the mouth of identical bottles containing the solutions. The weakest odorant, p-tertiary-butyl-alpha-methyl hydrocinnamaldehyde, was adopted as the standard diluted to a series of concentrations, 1%, 2%, up to 10%, then each compound under test, in 1% solution, was compared with the standard, and the concentration of the standard corresponding to the 1% solution of the compound under test, was determined. If the compound in 1% solution was stronger than the standard in 2% solution, but weaker than the 3% solution, the relative odor strength was 2.5. The odor was determined by a panel of six people and the results represent the average observations.

In column C the lasting power of the products is expressed as the time elapsed before equal samples of the liquid product, exposed to evaporation on a blotting paper lose their odor completely or by describing the intensity of the odor remaining after a period of time.

TABLE II.—ODOR CHARACTER AND STRENGTH

| Name of Compound (Substituted Hydrocinnamaldehyde) | Odor character | Relative odor strength | Lasting power |
|---|---|---|---|
| p-t. Butyl-alpha-methyl [1] | Lily and linden-blossom mild cyclamen, sweetish | [2] 1.0 | After 6 days=weak. After 12 days=no odor. |
| p-Isopropyl-alpha-methyl | Strong cyclamen, lily of the valley intensely sweet, some what "chemical" character. | 2.0–2.5 | After 6 days=fairly weak. After 20 days=weak. |
| n-Butyl | Strong floral cyclamen with green powdery character (notes). | 2.5 | After 6 days=strong. After 20 days=moderately strong. |
| n-Butyl-alpha-methyl | Very strong, floral cyclamen with woody green fine character. | 2.5 | After 6 days=fairly weak. After 20 days=weak, good. |
| Isobutyl | Strong, floral cyclamen with powdery character and warm notes of labdanum and sandalwood. | 6.0 | After 6 days=fairly weak. After 20 days=weak. |
| Isobutyl-alpha-methyl | Strong floral, cyclamen, very diffusive | 1.5–2.5 | After 6 days=fairly strong. After 20 days=moderately strong. |
| Iso-amyl | Floral, lily of the valley, fine and smooth | 1.5–2.0 | After 6 days=fairly strong. After 20 days=weak. |
| Isoamyl-alpha-methyl | Strong floral, lily of the valley with woody ambrette note, smooth with wide applicability. | 2.5 | After 6 days=fairly strong. After 20 days=moderately strong. |
| Cyclohexyl | Strong floral lily of the valley with fruity fragrance, very tenacious. | 1.5–2.0 | After 6 days—strong. After 20 days=quite strong; fine. |
| Cyclohexyl-alpha-methyl | Strong, floral and fruity lily of the valley, fine character and very tenacious. | 2.5–3.0 | After 6 days=strong. After 20 days=strong. |
| 3,4-tetra-methylene | Very strong, powdery floral note | 3.0–4.0 | After 6 days=strong. After 20 days=quite strong, powdery. |
| 3,4-tetra-methylene-alpha-methyl | Strong floral cyclamen with sandalwood and fruity note | 3.0 | After 6 days=fairly weak. After 20 days=weak. |
| n-2-butenyl | Very strong green floral with hyacinth and honey notes | 8.0 | After 6 days=strong. After 20 days=fairly strong. |
| n-2-butyenl-alpha-methyl | Very powerful green floral with powdery honey character. | 6.0 | After 6 days=strong. After 20 days=fairly strong. |

[1] Commercial product.
[2] Standard equals 1.0.

It is recognized in the perfume industry that the usefulness and value of a chemical compound depend on a number of factors, among which the most important are: odor character, odor strength, odor lasting power, stability under a variety of pH conditions, which are encountered in the several fields of application. These factors will be described below.

Table II describes in column A the odor character of the novel products briefly. The odors of isobutyl hydro- The above data demonstate that the novel products have long lasting power, a substantial advantage in many applications.

Since the shelf life of a perfume chemical as well as its stability in the many applications where exposure to air of the highly diluted substance is involved, are of primary importance, the stability of the novel substances of the invention to air oxidation was determined. An accelerated test of stability to air oxidation was conducted by placing a thin layer, about one-half inch of the products of the invention into an open wide-mouth bottle at 20–30° C. Atmosphere oxygen thus had continuous access to the product. The extent of oxidation was measured by following the decrease in aldehyde content, by oximation, since the oxidation involves largely conversion of the aldehyde group to the carboxyl group. Table III lists the products of this invention together with some of the known compounds for comparison. Decrease in aldehyde content is tabulated as well as the odor change after an exposure test of 5 weeks.

TABLE IV.—COMPARATIVE RESISTANCE TO AIR OXIDATION OF ORTHO AND PARA ISOMERS OF ISOBUTYL ALPHA-METHYL HYDROCINNAMALDEHYDE

| Sample used | Aldehyde content at start in percent | After 7 days at 55° C. in percent | Decrease in aldehyde content, percent |
|---|---|---|---|
| (1) Mixture of 77% para and 23% ortho isomers | 99 | 92 | 7 |
| (2) para isomer (97–98% pure) | 99 | 92 | 7 |
| (3) ortho isomer (95% ortho and 5% para) | 99 | 94 | 5 |

TABLE III
[Resistance to air oxidation at 25±5° C.]

| Name of substituted hydrocinnamaldehyde | Percent aldehyde at start | Percent aldehyde after 5 weeks | Loss of aldehyde in percent | Odor change after 5 weeks |
|---|---|---|---|---|
| p. Ethyl-alpha-methyl | 95 | 68 | 27/after 6 mos., 58 | Weak, but unchanged/weak. |
| p. n-Propyl-alpha-methyl | 93 | 80 | 13/after 6 mos., 35 | Weak/weak. |
| p. Isopropyl-alpha-methyl | 99 | 68 | 31)/after 6 mos., 65 | Poor; acid note/very acid, weak. |
| p-Tertiary-butyl-alpha-methyl | 99 | 76 | 23/after 6 mos., 62 product is solid | Poor, weak, and acid/note very acid, weak. |
| Isobutyl | 97 | (¹) | None/after 6 mos., 7 | Good, no change/weaker, good. |
| Isobutyl-alpha-methyl | 97 | (¹) | None/after 6 mos., 23 | Essentially unchanged/weak, same character. |
| n-Butyl | 96 | (¹) | None | (¹). |
| n-Butyl-alpha-methyl | 99 | 94 | 5 | (¹). |
| n-Amyl | 99 | 90 | 9 | Little change. |
| Isoamyl | 99 | 96 | 3 | No odor change. |
| n-Hexyl | 99 | (¹) | None | Slight change. |
| n-Hexyl-alpha-methyl | 98 | 88 | 10 | Do. |
| Cyclohexyl | 97 | (¹) | None | (¹). |
| Cyclohexyl-alpha-methyl | 99 | (¹) | do | Slight deterioration. |
| 3,4-tetramethylene | 99 | 94.5 | 4.5 | Good character. |
| 3,4-tetramethylene-alpha-methyl | 100 | 96 | 4 | (¹). |
| n-2-butenyl | 97 | 79 | 18 | Some deterioration. |

¹ Unchanged.

The results tabulated above show that stability generally increases with increasing molecular weight, and that stability is greater, for the n-butyl and isobutyl compounds which have a —CH$_2$— group adjacent to the ring, as compared with the para-isopropyl and tertiary butyl compound. The great stability to air oxidation for the cyclohexyl alpha-methyl hydrocinnamaldehyde, which has a —CH— adjacent to the ring, is a deviation, obviously attributable to the cyclic structure of the substituent. The n-2-butenyl compound is less stable than others, probably due to the unsaturated nature of its alkyl chain. However, this structural feature accounts for the outstanding odor strength of this product.

In order to determine whether the pure para and ortho isomers differ in stability to air oxidation from the mixture, an accelerated air oxidation test was conducted with isobutyl-alpha-methyl hydrocinnamaldehyde by keeping the samples for seven days at 50° C.–55° C. in an oven exposed to air and comparing the aldehyde content, by oximation, before and after the 7-day period. The results are reported below in Table IV.

It is evident from these results that the pure isomers have the same degree of stability to air as the mixtures.

The stability of the novel compounds of this invention was determined in an acidic medium, pH 1.7, under neutral conditions at pH 7, and in a strong alkaline medium, at pH 10.7. The conditions used for the test were more extreme than encountered normally in perfumery and cosmetics applications. A 1 gram sample of each substance was emulsified with 2 grams of non-ionic emulsifier, octyl phenoxy polyethoxy ethanol and diluted to a total weight of 200 grams, resulting in a one-half percent clear aqueous emulsion of each product. These solutions were subjected to accelerated aging, by keeping them in closed bottles for 10 days at room temperature and subsequently for 10 days at 50° C. The change in odor, which is a measure of product degradation, was evaluated by a panel of perfumers. The results are listed in Table V.

TABLE V.—STABILITY OF HYDROCINNAMALDEHYDES IN AQUEOUS EMULSION AT VARIOUS pH LEVELS MEASURED BY CHANGE IN ODOR

| Name of substituted hydrocinnamaldehyde | Neutral: pH 7.0; 10 days at 25° C.; 10 days at 50° C. | Acid: pH 1.7; 10 days at 25° C.; 10 days at 50° C. | Alkaline: pH 10.7; 10 days at 25° C. 10 days at 50° C. |
|---|---|---|---|
| p-Isopropyl-alpha-methyl | Slightly weaker | Weaker, slightly metallic | Much weaker. |
| p-Tert-butyl-alpha-methyl | Weak, unchanged odor | Very weak, no character | Weaker, slightly sour. |
| n-Butyl | Unchanged | Unchanged | Weak. |
| n-Butyl-alpha-methyl | do | Little change | Unchanged. |
| Isobutyl | do | Unchanged | Weak, modified. |
| Isobutyl-alpha-methyl | do | Slightly weaker, unchanged odor | Very slightly weaker, odor unchanged. |
| Isoamyl | do | Unchanged | Weak. |
| Isoamyl-alpha-methyl | do | Slightly weaker | Unchanged. |
| n-Hexyl | do | do | Weak. |
| Cyclohexyl | do | Unchanged | Very weak. |
| Cyclohexyl-alpha-methyl | do | Little change | Weaker, good character. |
| 3,4-tetramethylene | do | do | Very weak. |
| 3,4-tetramethylene-alpha-methyl | do | Unchanged | Unchanged. |
| n-2-butyl | do | Slightly modified | Very weak. |
| n-2-butenyl-alpha-methyl | do | Modified | Unchanged. |

The above data demonstrate that the alpha-methylated products are more stable in aqueous alkaline emulsion. The unmethylated products are somewhat more stable in an acidic emulsion. The p-isopropyl and p-tert. butyl compound show little stability both in an acidic and in an alkaline medium.

The relative stability under alkaline conditions is further illustrated in Table VI. Isobutyl hydrocinnamaldehyde, isobutyl-alpha-methyl hydrocinnamaldehyde, p-isopropyl and p-tert. butyl-alpha-methyl hydrocinnamaldehyde were incorporated into solid soda ash and sodium bicarbonate and observed over a period of 10 days. One gram of the compound was ground thoroughly in a mortar with 99 grams soda ash or bicarbonate until a fine uniform powder was obtained. The samples were kept for 10 days at 25° C. subjecting the compounds to the effects of both alkali and air. Degradation was indicated by change in odor.

of the invention, containing the methyl group in the alpha position, are remarkably stable in soap, and constitute outstanding soap perfumes.

The stability to detergents was determined by adding 0.2 gram of the substance under test to 99.8 grams of a commercial sample of detergent, consisting mainly of alkyl aryl sulfonates and phosphates, and evaluating the odor after predetermined time periods. The results are shown in Table VIII below.

TABLE VIII.—STABILITY IN SOLID DETERGENT, 0.2% CONCENTRATION

| Name of substituted hydrocinnamaldehyde | After a 10 day period at at room temp. | After an additional 10 day period at 50° C. |
|---|---|---|
| Isopropyl-alpha-methyl | Weak | Fair. |
| Tertiary buty-alpha-methyl | Rancid, chemical odor | Poor. |
| Isobutyl | Good, strong | Do. |
| Isobutyl-alpha-methyl | Very good and strong | Good, slightly weaker. |

In another test, the substance under test was incorporated into the detergent powder at 0.1% concentration, and the odor evaluated after a six-month shelf test. Isobutyl-alpha-methyl hydrocinnamaldehyde only lost a little of its original odor strength as compared with p-isopropyl-alpha-methyl hydrocinnamaldehyde and p-ter-

TABLE VI.—DEGRADATION IN SOLID ALKALI AFTER 10 DAYS AT 25° C.

| Name of substituted hydrocinnamaldehyde | 1 percent in solid soda ash | 1 percent solid Na-bicarbonate |
|---|---|---|
| | Odor | Odor. |
| Isobutyl | Sharp deteriorated | Slightly changed: |
| Isobutyl-alpha-methyl | Unchanged odor and strength | Unchanged. |
| p-Isopropyl-alpha-methyl | Weaker | Deteriorated. |
| p-tert.-Butyl-alpha-methyl | deteriorated cumin odor | Do. |

The above data show that the isobutyl-alpha-methyl hydrocinnamaldehyde is exceptionally stable to sodium bicarbonate and soda ash, and far superior to the p-isopropyl and p-tert.-butyl hydrocinnamaldehyde.

The stability of the novel compounds of the invention in soap, was determined with a commercial sample of soap stock, consisting of the sodium salts of high molecular weight fatty acids. Table VII indicates the results obtained in accelerated shelf life tests after an oven test of 2 weeks at 45° C. and two weeks at room temperature. This test is considered equivalent to several months at room temperature. Ten grams of the respective compound was milled into 990 grams of the soap stock, extruded, and pressed into soap cakes, which were wrapped for the test.

tiary butyl-alpha-methyl hydrocinnamaldehyde, which essentially lost the original odor strength and became flat.

Of the many cosmetic applications for the novel products, Table IX gives the results of extended shelf life measured by changes in odor, in talcum powder, antiperspirant lotion and cold cream. The antiperspirant lotion contained chlorohydrol, $Al_2(OH)_5Cl2H_2O$. The talcum powder contained 90% talc, 4% magnesium carbonate and 5% zinc stearate. The cold cream was a water-in-oil commercial preparation comprising stearic acid, beeswax, paraffin wax, lanolin, mineral oil and borax, of pH 8.5.

TABLE IX.—STABILITY OF SUBSTITUTED HYDROCINNAMALDEHYDE IN TALCUM POWDER, ANTIPERSPIRANT LOTION AND COLD CREAM

| Name of substituted hydrocinnamaldehyde | Talcum powder 0.5%; 3-month shelf test | Antiperspirant lotion 0.25%; 3-mo. shelf test | Cold cream 0.25 %; 4-wk. shelf test |
|---|---|---|---|
| p-Tertiary-butyl alpha-methyl | Odor changed unpleasant | Acid note | Very weak. |
| p-Isopropyl-alpha-methyl | do | do | Do. |
| Isobutyl | Good, almost unchanged | Almost unchanged | Practically unchanged. |
| Isobutyl-alpha-methyl | do | do | Do. |

The following examples illustrate the incorporation of the novel hydrocinnamaldehydes into perfumery compositions.

TABLE VII.—STABILITY OF SUBSTITUTED HYDROCINNAMALDEHYDES IN SOAP, ACCELERATED SHELF TEST

| Name of substututed hydrocinnaldehyde | Odor after 2 weeks in oven test at 45° C. and 2 weeks at 25° C. | After 7 months |
|---|---|---|
| n-Butyl | Fatty citrus note, weak | |
| n-Butyl-alpha-methyl | Excellent, very strong and floral-woody | |
| Isobutyl | Weak and modified | Still weaker. |
| Isobutyl-alpha-methyl-* | Very good, strong fresh fruity | Essentially unchanged. |
| Isoamyl | Weak, fatty | |
| Isoamyl-alpha-methyl | Very good, strong, warm ambrette note | |
| n-Hexyl | Weak, fatty | |
| n-Hexyl-alpha-methyl | Weak, lilac note | |
| Cyclohexyl | Weak, flat | |
| Cyclohexyl-alpha-methyl | Good, floral | |
| 3,4-tetramethylene- | Weak, unpleasant | |
| 3,4-tetramethylene-alpha-methyl- | Very good, strong, sandalwood note | |
| p-Isopropyl-alpha-methyl | Weak | Weak, thin metallic note. |
| p-tert.Butyl-alpha-methyl | Weak with metallic note | Leathery note unpleasant. |

* The mixture of para and ortho isomers used for the test.

The above data demonstrate that the novel compounds

EXAMPLE 4

A lilac formulation was prepared by mixing together the following ingredients in the proportions indicated:

| Lilac composition: | Parts by weight |
|---|---|
| Benzyl acetate | 45 |
| Alpha-amylcinnamic aldehyde | 70 |
| Phenylethyl alcohol | 180 |
| Anisic aldehyde | 45 |
| Hydroxycitronellal | 90 |
| Heliotropin | 90 |
| Phenylacetaldehyde dimethylacetal | 10 |
| Terpineol | 260 |
| Cinnamic alcohol | 90 |
| Isoeugenol | 20 |
| Isobutylhydrocinnamaldehyde aldehyde (containing 70% by weight of para isomer) | 100 |
| | 1000 |

EXAMPLE 5

A Wistaria composition was prepared as follows:

| Wistaria composition: | Parts by weight |
|---|---|
| Phenylethyl alcohol | 125 |
| Hydroxycitronellal | 50 |
| Heliotropin | 50 |
| Terpineol | 125 |
| Eugenol | 100 |
| Amyl salicylate | 75 |
| Benzyl acetate | 50 |
| Ylang-ylang oil | 50 |
| Linalool Brazil | 75 |
| Ionone 100% | 25 |
| 2-methoxynaphthalene | 15 |
| Anisic aldehyde | 100 |
| Para-methylacetophenone | 25 |
| Vanillin | 10 |
| Methyl methylanthranilate | 25 |
| Isobutyl hydrocinnamaldehyde (containing 70% by weight of para isomer) | 100 |
| | 1000 |

EXAMPLE 6

A sweet pea composition was prepared as follows:

| Sweet pea composition: | Parts by weight |
|---|---|
| Benzyl acetate | 300 |
| Phenylethyl acetate | 25 |
| Cinnamic alcohol | 50 |
| Alpha-amylcinnamic aldehyde | 50 |
| Methyl anthranilate | 5 |
| Anisic aldehyde | 25 |
| Geraniol | 50 |
| Isoeugenol | 25 |
| Linalool Brazil | 15 |
| Amyl salicylate | 25 |
| Benzyl salicylate | 100 |
| Terpineol | 170 |
| 2-methoxynaphthalene | 10 |
| Methyl phthalate | 50 |
| Isobutyl hydrocinnamaldehyde (containing 70% by weight of para isomer) | 100 |
| | 1000 |

EXAMPLE 7

Cyclamen base was prepared by mixing the following ingredients in the formulation indicated below:

| Cyclamen base composition: | Parts by weight |
|---|---|
| Isobutyl alpha-methyl hydrocinnamaldehyde | 250 |
| Citronellal | 50 |
| Phenylacetaldehyde dimethylacetal | 10 |
| Anisic alcohol | 50 |
| Linalool | 100 |
| Methylionone | 10 |
| Benzyl salicylate | 125 |
| Terpineol | 100 |
| Ethyl adipate | 305 |
| | 1000 |

This preparation is particularly suitable for incorporation into soaps, since the odor is very stable.

The following example illustrates the use of n-butyl-alpha-methyl hydrocinnamaldehyde in perfumery compositions.

EXAMPLE 8

| Wood violet composition: | Parts by weight |
|---|---|
| Cuminic aldehyde 10% solution | 5 |
| Verbena oil | 5 |
| Ylang-ylang extra | 20 |
| Orris concrete | 20 |
| Methyl heptine carbonate 10% solution | 50 |
| Phenyl ethyl alcohol | 100 |
| n-Butyl-alpha-methyl-hydrocinnamaldehyde | 200 |
| Methyl ionone | 200 |
| Ionone AB (mixture of alpha and beta isomers) | 400 |
| | 1000 |

The following example illustrates the use of 3,4-tetramethylene - alpha - methyl hydrocinnamaldehyde in perfumery compositions.

EXAMPLE 9

| Sandalwood composition: | Parts by weight |
|---|---|
| Acetocumene | 5 |
| Civet artificial 10% solution | 5 |
| Coumarine | 10 |
| Cinnamic alcohol | 10 |
| Musk ambrette | 20 |
| Vetivert oil Haiti | 50 |
| 3,4 - tetramethylene - alpha - methyl - hydrocinnamaldehyde | 200 |
| Cedarwood oil | 300 |
| Amyris oil | 400 |
| | 1000 |

The novel compositions of the invention may satisfactorily be incorporated into a variety of products, such as soaps, detergents, antiperspirants, lipstick, cold cream, shaving preparations, and room deodorizers, sold in aerosols together with a propellant. It is manifest from the foregoing that novel perfuming agents have been made made available by this instant invention, which, in addition to their outstanding and unique fragrance, exhibit striking stability to oxidation, acid, neutral conditions, and alkali. The hydrocinnamaldehydes prepared as described are suitable for incorporation into a variety of creams, powders, lotions, which are applied to the face, hair, scalp, hands, feet, deodorant and antiperspirant preparations, shaving creams, depilatories, nail, article and sun-tan preparations. Those skilled in the art will readily visualize that several variations of the examples set forth herein, are possible without departing from the spirit of the invention, which is to be limited only by the scope of the appended claims.

What is claimed is:
1. A composition consisting essentially of a mixture of the ortho and para isomers of isobutyl-alpha-methyl-hydrocinnamaldehyde.
2. A composition consisting essentially of a mixture of about 77% of the para isomer and about 23% of the ortho isomer of isobutyl-alpha-methyl-hydrocinnamaldehyde.

References Cited

UNITED STATES PATENTS

| | | | |
|---|---|---|---|
| 2,856,431 | 10/1958 | Craig | 260—599 |
| 2,976,321 | 3/1961 | Dorsky et al. | 260—599 |
| 2,889,254 | 6/1959 | Fiore et al. | 167—94 |
| 2,918,412 | 12/1959 | Wood | 167—94 |
| 2,875,131 | 2/1959 | Carpenter et al. | 260—599 |
| 3,023,247 | 2/1962 | Scriabine | 260—599 |
| 3,372,199 | 3/1968 | Rylander et al. | 260—599 |

BERNARD HELFIN, Primary Examiner

U.S. Cl. X.R.

252—522